Nov. 10, 1959     H. B. WARREN, JR     2,912,251
EQUALIZER FOR TANDEM SUSPENSION SYSTEM
Filed April 3, 1957     2 Sheets-Sheet 1
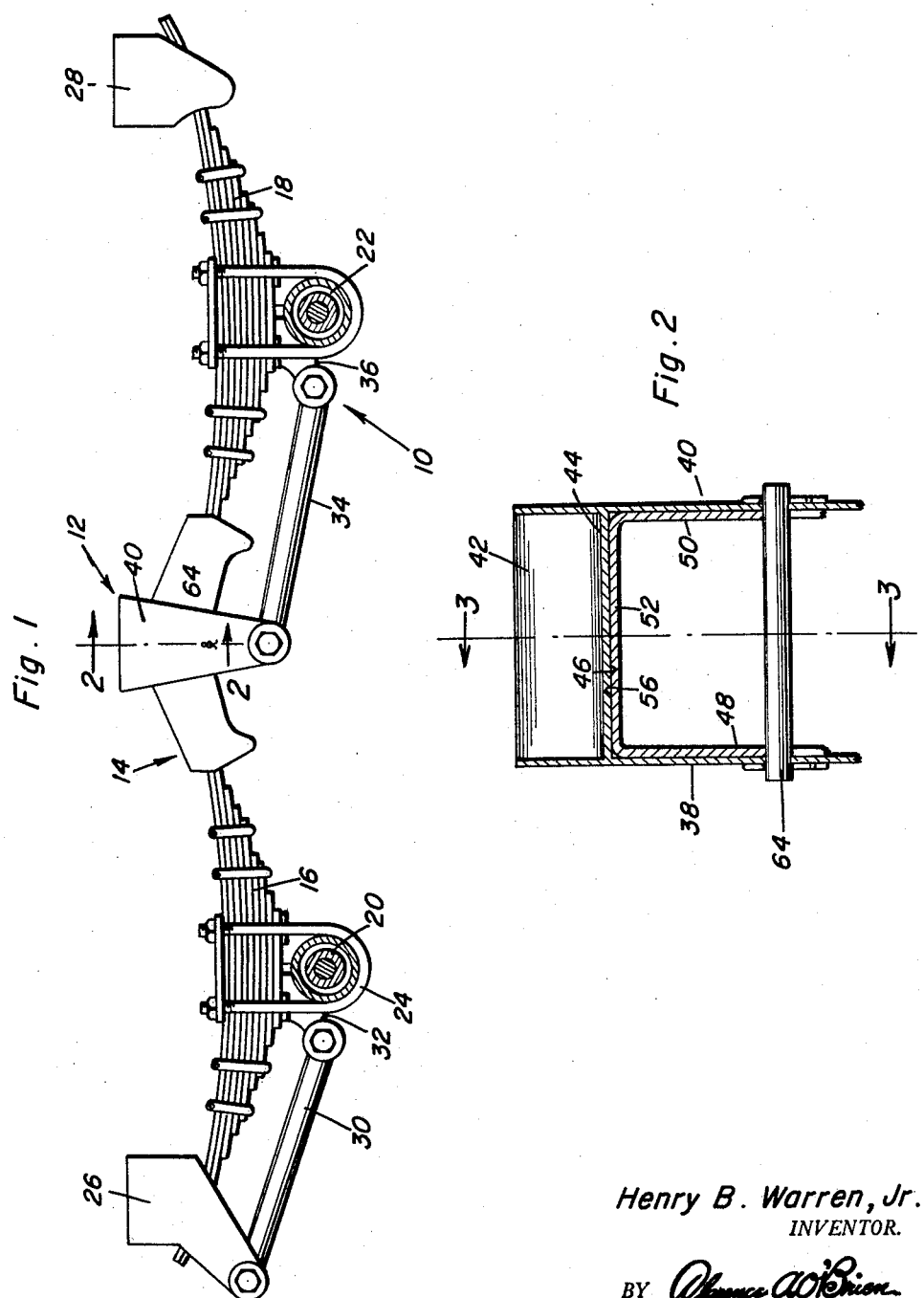
Henry B. Warren, Jr.
INVENTOR.

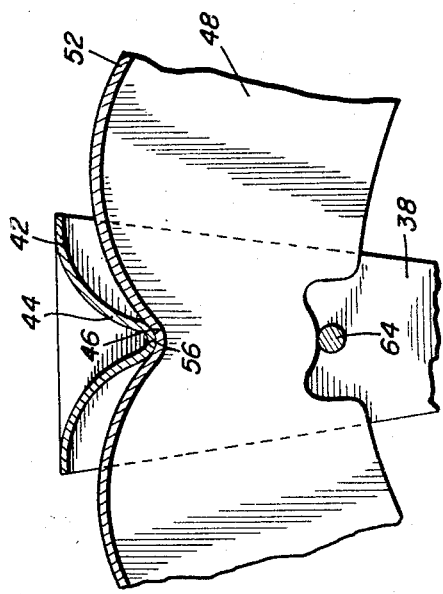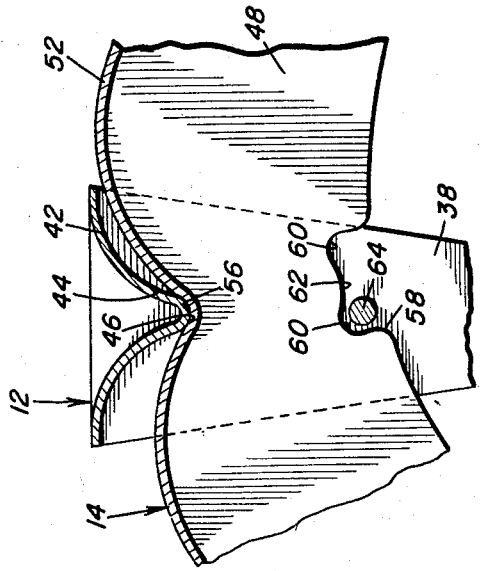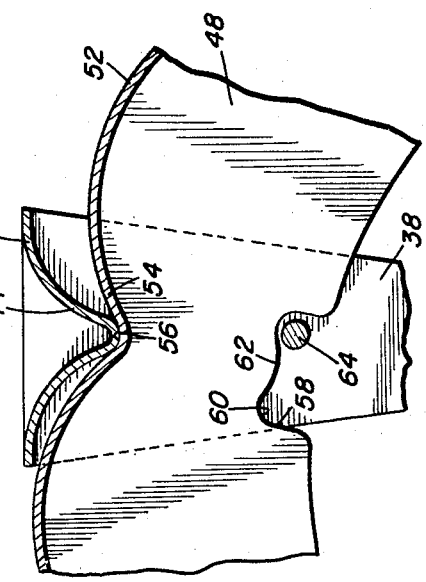

United States Patent Office 2,912,251
Patented Nov. 10, 1959

2,912,251

EQUALIZER FOR TANDEM SUSPENSION SYSTEM

Henry B. Warren, Jr., Springfield, Mo., assignor to Hutco Equipment Company, Springfield, Mo., a corporation of Missouri Application April 3, 1957, Serial No. 650,336

4 Claims. (Cl. 280—104.5)

The present invention generally relates to a novel structural arrangement in a tandem axle suspension system employed in connection with load carrying vehicles and more particularly to an equalizer for use in conjunction with tandem suspension systems.

In conventional tandem axle systems presently being employed, an equalizer is pivotally supported from a bracket with the equalizer receiving the adjacent ends of a forwardly and rearwardly disposed load supporting spring whereby the load supported by the axles will be equalized. These equalizers are supported from transverse pivot pins and are subject to considerable wear even though lubrication facilities are usually provided inasmuch as relatively large forces are encountered due to the heavy loads carried by vehicles employing tandem axle arrangements. Accordingly, it is the primary object of the present invention to provide an equalizer interconnecting the forward and rear springs of a tandem system in which the equalizer is rockably engaged with an equalizer hanger bracket with no positive pivotal connection being disposed for mounting the equalizer on the bracket thereby eliminating the use of bearings, bushings and lubrication fittings and eliminating the necessity for replacement of certain of these elements.

Another object of the present invention is to provide an equalizer which rocks on an equalizer bracket in a tandem axle arrangement with the equalizer being held in place normally by the springs inasmuch as the force on the springs under load conditions is always upward.

A further object of the present invention is to provide an equalizer in accordance with the preceding objects in which a transverse pin is provided in a recess in the bottom of the equalizer for limiting the rocking movement of the equalizer in relation to the equalizer bracket in the event one of the springs is broken.

Another important feature of the present invention is to provide an equalizer which is extremely simple in construction, resistant to wear, provided with a minimum of moving parts and extremely inexpensive to manufacture and maintain.

These together with other objects and advantages which will become subsequently apparent reside in the details of construction and operation as more fully hereinafter described and claimed, reference being had to the accompanying drawings, forming a part hereof, wherein like numerals refer to like parts throughout, and in which:

Figure 1 is a side elevational view of a schematic nature showing a tandem axle suspension system employing the equalizer of the present invention with the tandem axles being shown in section and the associated load carrying platform or body being omitted;

Figure 2 is a vertical sectional view taken substantially upon a plane passing along section line 2—2 of Figure 1 illustrating the details of construction of the hanger bracket and the relationship of the equalizer and transverse pin;

Figure 3 is a longitudinal sectional view taken substantially upon a plane passing along section line 3—3 of Figure 2 illustrating further structural details of the hanger bracket and the equalizer associated therewith with the structural elements being enlarged for clarity;

Figure 4 is a detailed sectional view similar to Figure 3 showing the equalizer in one extreme position; and Figure 5 is a sectional view similar to Figure 4 illustrating the equalizer in the other extreme position.

Referring now specifically to the drawings, the numeral 10 generally designates the tandem axle suspension system including an equalizer hanger bracket generally designated by the numeral 12, an equalizer generally designated by numeral 14 which form the present invention and which are associated with a forward leaf spring 16 and a rear leaf spring 18 connected to a forward axle 20 and a rear axle 22 respectively by employing U-bolts 24 in a conventional manner. The forward end of the forward spring 16 and the rear end of the rear spring 18 is supported in the usual manner from forward and rear angle brackets 26 and 28 respectively which may be of conventional construction. A torque arm 30 may be employed between the forward angle bracket 26 and an attaching bracket 32 on the forward axle 20 and a rear trailing torque arm 34 may be provided between the hanger bracket 12 and an attaching bracket 36 on the rear tandem axle 22.

Referring now specifically to Figures 2–5, the structure of the equalizer hanger bracket 12 includes a member of generally inverted U-shaped configuration including a pair of side members 38 and 40 interconnected by a top or bight member 42 to form the bracket 12 which is generally H-shaped in cross section. As clearly shown in Figures 3–5, the top member or bight member 42 extends between the side members 38 and 40 and has a central depressed portion 44 terminating in a rounded transverse bottom edge 46 with the portion on each side of the edge 46 curving upwardly and towards the outer edges of the side members 38 and 40. Thus, the rounded lower edge 46 of the depressed central portion 44 forms a transverse convex surface for forming a rocking support for engagement with the equalizer 14.

The equalizer 14 is also generally of an inverted U-shaped configuration including a pair of side members 48 and 50 rigidly interconnected by a top member or bight member 52. The bight member 52 as well as the side members 48 and 50 are provided with a centrally disposed depressed area 54 terminating in a concave rounded edge 56 in the bottom of the depressed area 54 for rockingly engaging the bottom curved edge 46 of the depressed area 44 on the bracket 12 thus providing a rocking support between the equalizer 14 and the bracket 12 and thus eliminating transverse pivot pins and the associated bearings, bushings and lubrication facilities.

Each of the side members 48 and 50 of the equalizer 14 has a notch or recesses 58 disposed centrally therein generally in position in alignment with the central depressed area 44. Each of the notches 58 includes a pair of concave seat areas 60 and a central downwardly curved area 62. Extending between the side members 38 and 40 of the bracket 12 is a transverse limit pin 64 which is received in the notches 58 thus limiting the rocking movement of the equalizer in relation to the equalizer bracket so that in the event one of the springs is broken the equalizer will be retained on the equalizer bracket. Also, the pin 64 will effectively limit the rocking movement of the equalizer 14 in relation to the bracket 12.

With this construction, the equalizer 14 will effectively rock about the surface 46 and this construction eliminates the necessity of replaceable bearings and lubrication thereof thus simplifying the structure and reducing the maintenance cost thereof and providing an equalizer which is effective for the purposes of equalizing the load supported by the axles 20 and 22 respectively.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In a tandem spring suspension unit, an equalizer hanger bracket including a pair of spaced side walls and a transverse interconnecting wall, said interconnecting wall having a tranvsersely extending depressed central area forming a pair of downwardly facing concave surfaces defining a rounded nose therebetween, an equalizer disposed between the spaced side walls and receiving the adjacent ends of the tandem spring units, said equalizer including a transverse member having a central depressed area defining a pocket receiving and rockingly engaging said rounded nose of the hanger bracket thereby providing a support for the equalizer and resisting upward force on the equalizer exerted by the spring units and permitting equalization of the load supported by the spring units.

2. In a tandem spring suspension unit, an equalizer hanger bracket including a pair of spaced side walls and a transverse interconnecting wall, said interconnecting wall having a transversely extending depressed central area forming a pair of downwardly facing concave surfaces defining a rounded nose therebetween, an equalizer disposed between the spaced side walls and receiving the adjacent ends of the tandem spring units, said equalizer including a transverse member having a central depressed area defining a pocket receiving and rockingly engaging said rounded nose of the hanger bracket thereby providing a support for the equalizer and resisting upward force on the equalizer exerted by the spring units and permitting equalization of the load supported by the spring units, a transverse pin extending between the side walls of the hanger bracket, said equalizer having a longitudinally extending notch receiving said pin whereby rocking movement of the equalizer will be limited.

3. A load equalizer assembly for tandem spring suspension systems comprising a supporting bracket of generally U-shaped configuration having a bight portion and a pair of spaced side members depending therefrom, said bight portion having a centrally depressed area extending between said side members forming a rounded transverse edge, an equalizer of generally U-shaped configuration having a bight portion and a pair of spaced side members depending therefrom, said bight portion of the equalizer having a centrally depressed area extending between the side members thereof presenting a pair of downwardly convergent convex surfaces joined by an upwardly facing rounded concave trough extending between the side members of the equalizer, said supporting bracket being nested over said equalizer such that said rounded transverse edge of the supporting bracket is seated within said rounded concave trough of the equalizer permitting rocking movement therebetween, the lower edges of the side members of said equalizer being provided with elongate notches, and a pin extending between and carried by the side members of said supporting bracket projecting through the confines of said notches.

4. The assembly as defined in and by claim 3 wherein upper portions of the side members of said supporting bracket extend above the centrally depressed area of the bight portion thereof providing an H-shaped cross-section in such area.

References Cited in the file of this patent

UNITED STATES PATENTS

| | | |
|---|---|---|
| 461,016 | Gummer | Oct. 13, 1891 |
| 1,517,134 | Wade | Nov. 25, 1924 |
| 1,587,509 | Coutant | June 8, 1926 |
| 1,892,668 | Heiney | Jan. 3, 1933 |
| 2,193,567 | Pointer | Mar. 12, 1940 |
| 2,577,322 | Frazier | Dec. 4, 1951 |
| 2,653,035 | Ward | Sept. 22, 1953 |